United States Patent
Wang

(10) Patent No.: US 10,104,339 B1
(45) Date of Patent: Oct. 16, 2018

(54) ELECTRONIC DEVICE AND VIDEO DISPLAY METHOD

(71) Applicant: HON HAI PRECISION INDUSTRY CO., LTD., New Taipei (TW)

(72) Inventor: Po-Chung Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/831,492

(22) Filed: Dec. 5, 2017

(30) Foreign Application Priority Data

Aug. 3, 2017 (TW) .............................. 106126293 A

(51) Int. Cl.
*H04N 7/15* (2006.01)
*H04N 21/485* (2011.01)
*G06F 3/048* (2013.01)

(52) U.S. Cl.
CPC .............. *H04N 7/15* (2013.01); *G06F 3/048* (2013.01); *H04N 21/4858* (2013.01)

(58) Field of Classification Search
CPC ............ H04N 7/15; H04N 7/152; H04N 7/14; H04N 7/147; H04N 21/4858; H04N 21/4316; H04N 21/440272; G06F 3/048

USPC ........................................... 348/14.01–14.16
See application file for complete search history.

(56) References Cited

U.S. PATENT DOCUMENTS

| 7,554,571 B1 * | 6/2009 | Beck ...................... H04N 7/147 348/14.07 |
| 2012/0249877 A1 * | 10/2012 | Hernandez Costa ........................ H04N 21/4316 348/564 |
| 2013/0328998 A1 * | 12/2013 | Duckworth ............ H04N 7/152 348/14.07 |

* cited by examiner

*Primary Examiner* — Melur Ramakrishnaiah
(74) *Attorney, Agent, or Firm* — ScienBiziP, P.C.

(57) ABSTRACT

An electronic device for displaying video signals on a display device has a processing device and a storage device. The processing device generates a user interface including video areas for showing the video signals on the display device. The processing device determines a first area size for the video areas based on an interface size of the user interface, a row quantity and an aspect ratio, to arrange the video areas. The processing device adjusts the first area size to generate a second area size and a third area size for the video areas according to the interface size, when the number of the video areas in each row is not equal to each other. The processing device shows the video signals in the video areas based on the second area size and the third area size on the user interface of the display device.

19 Claims, 6 Drawing Sheets

ELECTRONIC DEVICE AND VIDEO DISPLAY METHOD

CROSS-REFERENCE TO RELATED APPLICATIONS

This application claims priority to Taiwanese Patent Application No. 106126293 filed on Aug. 3, 2017, the contents of which are incorporated by reference herein.

FIELD

The subject matter herein generally relates to a video interface and a video display method.

BACKGROUND

User interface of most video conferencing systems cannot be adjusted. Thus, it is inconvenient for the users to see each of the meeting places in one videoconference when meeting members participate at many meeting places.

BRIEF DESCRIPTION OF THE DRAWINGS

Implementations of the present technology will now be described, by way of example only, with reference to the attached figures.

DETAILED DESCRIPTION

Figure 1:
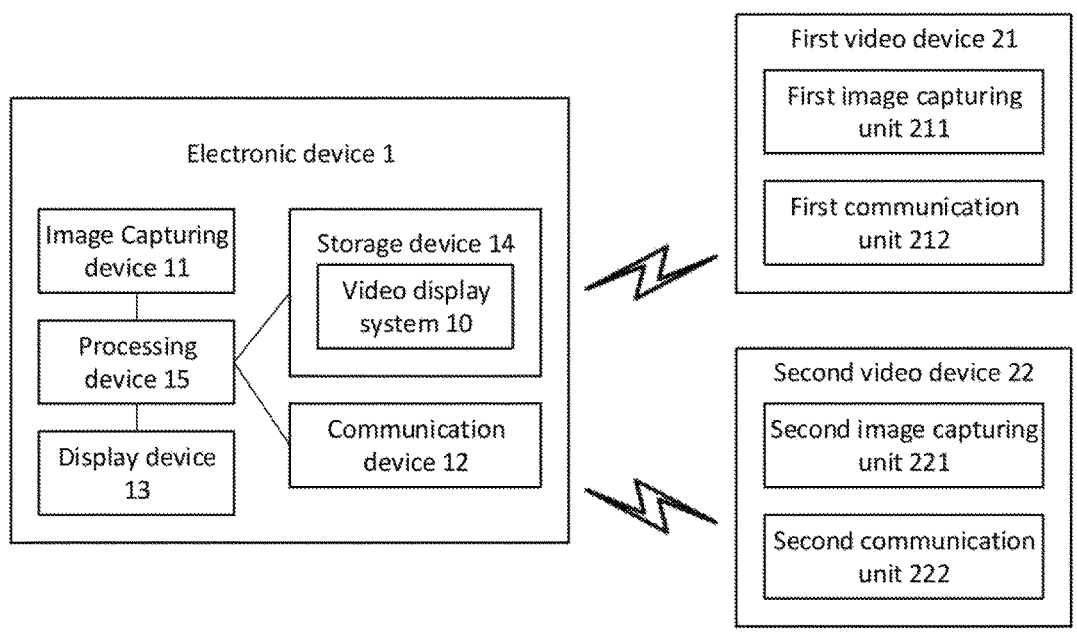
FIG. 1 is a block diagram of one exemplary embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates an exemplary embodiment of an electronic device 1 coupled to at least one video device. In the embodiment, the electronic device 1 is coupled to two video devices 21 and 22, and electronic device 1 can include an image capturing device 11, a communication device 12, a display device 13, a storage device 14, and a processing device 15. The image capturing device 11, the communication device 12, the display device 13, and the storage device 14 are coupled to the processing device 15 via a system bus (not shown).

In at least one embodiment, the first video device 21 includes a first image capturing unit 211 and a first communication unit 212, and the second video device 22 includes a second image capturing unit 221 and a second communication unit 222. The image capturing units 211 and 221 can capture real-time images to form video signals, and the communication units 212 and 222 can communicate with the communication device 12 to transmit the video signals to the electronic device 1.

In at least one embodiment, the electronic device 1 and the video devices 21 and 22 can be a mobile phone, a tablet, a desktop, a notebook, or other electronic device. FIG. 1 illustrates only one example of an electronic device 1, and the electronic device 1 in other embodiments can include more or less components than as illustrated, or have a different configuration of the various components. In addition, FIG. 1 also illustrates only one example of video devices 21 and 22, the video devices 21 and 22 in other embodiments can include more or less components than as illustrated, or have a different configuration of the various components. In at least one embodiment, components in the first video device 21 can be different from those in the second video device 22.

In at least one embodiment, the image capturing device 11, the first image capturing unit 211, and the second image capturing unit 221 can be a charge-coupled device (CCD) image sensor, a complementary metal-oxide-semiconductor (CMOS) image sensor, or a camera. In the embodiment, the image capturing device 11 can be internally coupled to the processing device 15 of the electronic device 1. In at least one embodiment, the image capturing device 11 can have a third communication unit (not shown) externally coupled to the electronic device 1 to provide a video signal to the electronic device 1 via the communication device 12. In at least one embodiment, the third communication unit of the image capturing device 15 can directly communicate with the first communication unit 212 and the second communication unit 222 to receive the video signals from the first video device 21 and the second video device 22.

In at least one embodiment, the communication device 12, the first communication unit 212, and the second communication unit 222 can adopt customizable protocols or follow existing standards or de facto standards such as BLUETOOTH, ETHERNET, IEEE 802.11 and IEEE 802.15 series, Wireless USB, infrared communication or telecommunication standards such as GSM, CDMA2000, TD-SCDMA, WiMAX, 3GPP-LTE, and TD-LTE.

In at least one embodiment, the display device 13 can include a display using liquid crystal display (LCD) technology, an organic light emitting diode (OLED) display technology, or light emitting polymer display (LPD) technology, although other display technologies can be used in other embodiments. In addition, the display device 13 can show input information when users input the input information via an input device (not shown). In at least one embodiment, the display device 13 can be integrated with a touch detecting unit (not shown) to form a touch screen, such as an LCD touch screen or an OLED touch screen, for detecting at least one touch on the display device 13. The touch detecting unit can be a resistive touch sensor, a capacitive touch sensor, or other forms of electronic or optical sensor to determine coordinates of the touch.

In at least one embodiment, the storage device 14 can be a non-volatile computer readable storage medium that can be electrically erased and reprogrammed, such as read-only memory (ROM), random-access memory (RAM), erasable programmable ROM (EPROM), electrically EPROM (EEPROM), hard disk, solid state drive, or other forms of electronic, electromagnetic, or optical recording medium. In at least one embodiment, the storage device 14 can include interfaces that can enable access to the aforementioned computer readable storage medium, to enable the electronic device 1 to connect to and access such computer readable storage medium. In another embodiment, the storage device 14 can include a network accessing device to enable the electronic device 1 to connect and access data stored in a remote server or a network-attached storage.

In at least one embodiment, the processing device 15 can be a processor, a central processing unit (CPU), a graphic processing unit (GPU), a system on chip (SoC), a field-programmable gate array (FPGA), or a controller for executing the program instruction in the storage device 14. The processing device 15 can further include an embedded system or an application specific integrated circuit (ASIC) having embedded program instructions.

Figure 2:
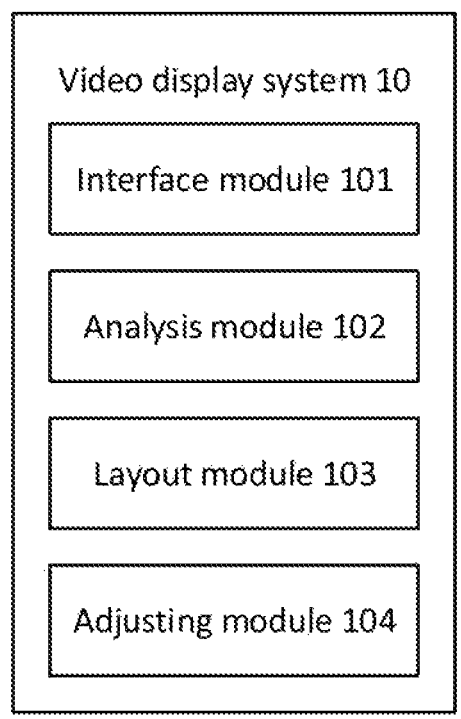
FIG. 2 is a block diagram of a second exemplary embodiment of function modules of a video display system in the electronic device of FIG. 1.

FIG. 2 illustrates a second exemplary embodiment of function modules of the video display system 10 in the electronic device 1 of FIG. 1. In at least one embodiment, the video display system 10 can include one or more modules, for example, an interface module 101, an analysis module 102, a layout module 103 and an adjusting module 104. "Module," as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

In at least one embodiment, the interface module 101 generates a user interface including a plurality of video areas for showing a plurality of video signals on the user interface of the display device 13. In at least one embodiment, the analysis module 102 analyzes a plurality of parameters, such as an interface size, a predefined aspect ratio, and the number of the video signals, to determine the area sizes of the video areas. In at least one embodiment, the layout module 103 arranges a layout of the user interface based on the area sizes and shows the video signals in the video areas on the display device 13. In at least one embodiment, the adjusting module 104 can adjust the determined area sizes of the video areas based on the arranged layout and the interface size.

Figure 3:
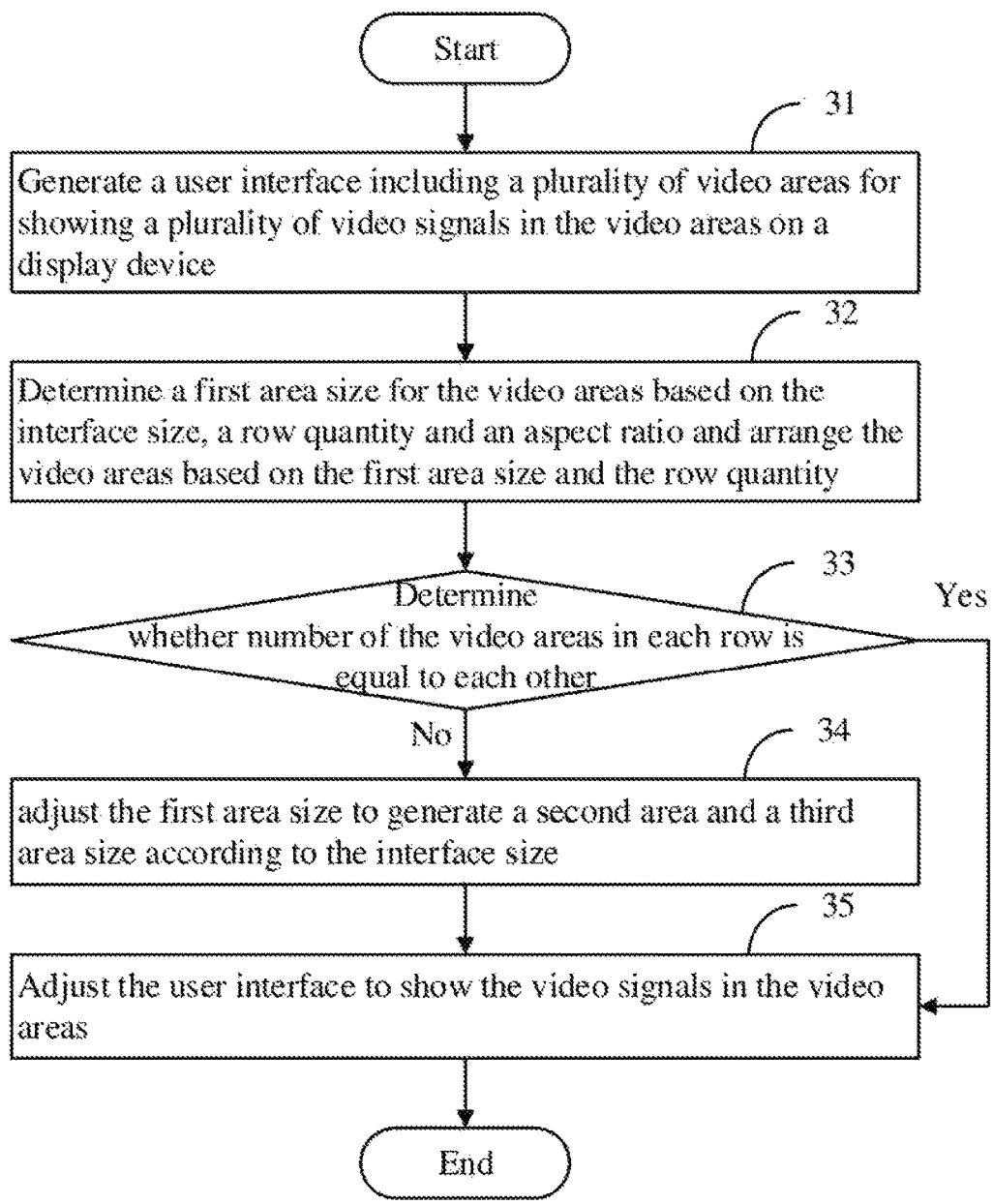
FIG. 3 illustrates a flowchart of a third exemplary embodiment of a video display method for the electronic device of FIG. 1.

FIG. 3 illustrates a flowchart in accordance with a third exemplary embodiment. The example method is provided by way of example, as there are a variety of ways to carry out the method. The method described below can be carried out using the configuration illustrated in FIG. 1, for example, and various elements of these figures are referenced in explaining the example method. Each block shown in FIG. 3 represents one or more processes, methods, or subroutines, carried out in the example method. Furthermore, the order of blocks is illustrative only and can change. Additional blocks can be added or less blocks can be utilized without departing from this disclosure. The example method can begin at block 301.

At block 31, the interface module 101 generates a user interface including a plurality of video areas for showing a plurality of video signals in the video areas on the display device 13.

In at least one embodiment, the interface module 101 can generate X video areas based on the number of the video signals to be shown on the display device 13. In one embodiment, the interface module 101 can generate X video areas for X video signals.

In at least one embodiment, the communication device 12 is coupled to at least one video device. The number of the at least one video device is N. The electronic device 1 can show X video signals generated by X signal sources selected from the N video devices and the image capturing device 11 on the display device 13. In a first embodiment, each of the N video devices provides a video signal to the communication device 12, and the electronic device 1 shows the N video signals received from the N video devices on the display device 13. In the first embodiment, X is equal to N. In a second embodiment, a specific one of the N video devices provides two video signals, each of the other N video devices provides one video signal, and the electronic device 1 shows the N+1 video signals received from the N video devices on the display device 13. In the second embodiment, X is equal to N+1. In the second embodiment, the specific video device can provide a first video signal generated from an image capturing unit of the specific video device and a second video signal showing a screen image shared from the specific video device. In a third embodiment, the image capturing device 11 provides a video signal, each of the N video devices provide a video signal, and the electronic device 1 shows the N+1 video signals of the image capturing device 11 and the N video devices on the display device 13. In the third embodiment, X is equal to N+1. In a fourth embodiment, the electronic device 1 shows the N video signals selected from the N video signals of the N video devices and the video signal of the image capturing device 11 on the display device 13. In the fourth embodiment, X is equal to N.

For example, there is a video conference between ten meeting places including a local conference room and nine remote conference rooms. In one embodiment, the electronic device 1 is installed in the local conference room, and nine video devices are respectively installed in the nine remote conference rooms. The video signal captured by the image capturing device 11 of the electronic device 1 and the nine video signals captured by the nine video devices can be shown in the ten video areas. In the embodiment, each of the nine video devices can include a display unit showing the ten video signals in the ten video areas.

In at least one embodiment, the interface module 101 can set an index for each of the video areas, and arrange the video areas according to the indexes. In one embodiment, the user can directly set the indexes of the video areas. In at least one embodiment, the indexes are arranged in numerical order. In at least one embodiment, the interface module 101 can arrange the video signals to show in the video areas based on the importance of the video signals.

Figure 6A:
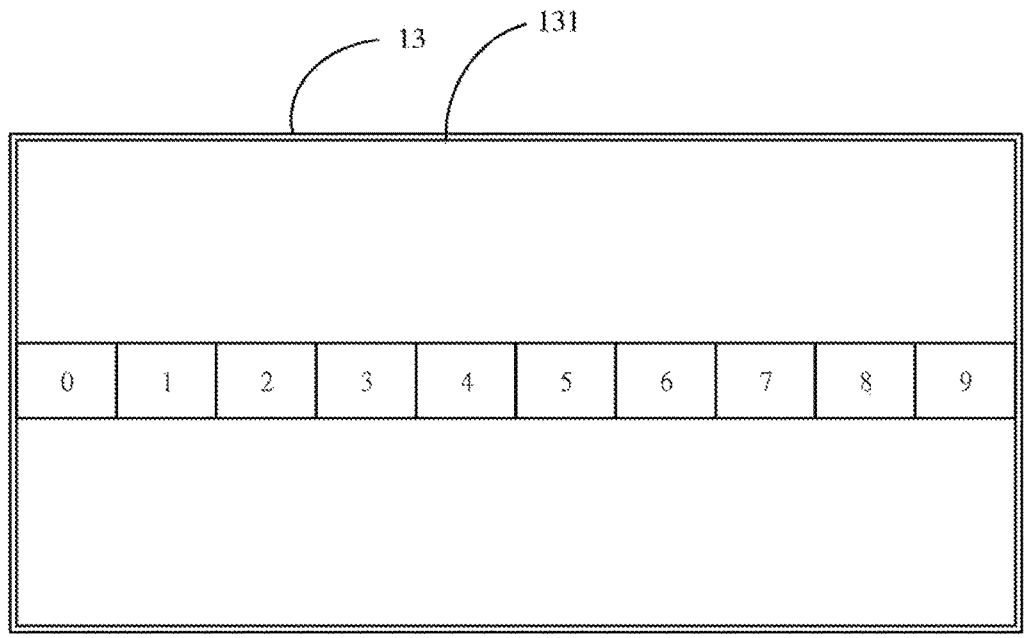
FIG. 6A is a block diagram of an eighth exemplary embodiment of one user interface shown on the display device of the electronic device.

FIG. 6A is a block diagram of an eighth exemplary embodiment of one user interface 131 shown on the display device 13 of the electronic device 1. The processing device 15 can show the user interface 131 on the display device 13. The user interface 131 can include the ten video areas having the indexes 0 to 9 for showing the ten video signals. In addition, when there is a video conference between ten meeting places including a local conference room and nine remote conference rooms, the video signal captured by the image capturing device 11 of the electronic device 1 can be set as a main video signal. All of the nine video signals captured by the nine video devices can be set as nine secondary video signals. Thus, the interface module 101 can arrange the main video signal to show in the video area having the index 0, and arrange the nine secondary video signal to show in the video area having the indexes 1 to 9.

In at least one embodiment, the interface module 101 can generate the user interface 131 based on a size of the display device 13. Thus, an interface size of the user interface 131 can be identical to a display region size of the display device 13. The interface size includes an interface width and an interface height, and the display region size includes a display region width and a display region height. In at least one embodiment, the interface width can be identical to the display region width and the interface height can be identical to the display region height.

At block 32, the analysis module 102 determines a first area size for the video areas based on the interface size, a row quantity and an aspect ratio, and arranges the video areas based on the first area size and the row quantity. In the embodiment, the video areas are arranged in at least one row on the user interface 131. In the embodiment, the row quantity is set to equal to the number of the at least one row, and the aspect ratio is predefined for the video areas.

In at least one embodiment, the analysis module 102 determines average number of the video areas per row, and then determines a first area width based on the interface width and the average number. In at least one embodiment, the analysis module 102 further determines a first area height for the video areas based on the first area width and the aspect ratio. For example, the interface width is 100 cm, the interface height is 30 cm, and the ten video areas are arranged in two rows. The analysis module 102 can set the first area width as 20 cm based on the average number equal to five, and set the first area height as 11.25 cm based on the aspect ratio being 16:9. Then, the layout module 103 can arrange the ten video areas in two rows on the user interface 131 based on the first area width and the first area height.

In at least one embodiment, the analysis module 102 determines a reference row number based on the interface height and the first area height. The analysis module 102 can divide the interface height by the first area height to generate a height divided result. In the embodiment, the analysis module 102 can determine the reference row number being equal to a largest integer that is less than the height divided result. Then, the analysis module 102 determines whether reference row number is greater than the row quantity. If the reference row number is less than or equal to the row quantity, the analysis module 102 can set the first area width and the first area height as the first area size. The layout module 103 can further arrange the video areas based on the first area size and the row quantity for showing the video signals on the user interface 131 of the display device 13. In one embodiment, the sizes of the video areas are arranged to be identical to the first area size. If the reference row number is greater than the row quantity, the analysis module 102 can adjust the row quantity, and further adjust the first area width and the first area height based on the adjusted row quantity. A detailed embodiment for block 32 can refer to FIG. 4A and FIG. 4B.

At block 33, the analysis module 102 determines whether the number of the video areas in each row is equal to each other. If the number of the video areas in each row is equal to each other, the procedure goes to block 35. If the number of the video areas in a specific one of the rows is different from that in each of the other rows, the procedure goes to block 34.

In at least one embodiment, the analysis module 102 can directly check the numbers of the video areas in the first one and the last one of the rows when the video areas are arranged on the user interface 131. Then, the analysis module 102 can compare the number of the video areas in the first row with the number of the video areas in the last row. For example, the interface module 101 can arrange three video areas respectively in the first rows and the second rows, and arrange four video areas in the last row, when there are ten video signals to be shown in the ten video areas. Thus, the analysis module 102 can determine that the number of the video areas in the first row is three and the number of the video areas in the last row is four. The analysis module 102 can determine that the number of the video areas in each row is not equal to each other In at least one embodiment, the analysis module 102 can determine average number of the video areas per row again based on the row quantity determined at block 32. If the average number is an integer, the analysis module 102 can determine the number of the video areas in each row is equal to each other. If the average number is not an integer, the analysis module 102 can determine the number of the video areas in each row is not equal to each other. For example, the number of the video areas is ten, and the determined row quantity is two. Thus, the average number is five which is an integer. Thus, the analysis module 102 can determine that the number of the video areas in each row is equal to five and equal to each other. However, the average number is 3.3 which is not an integer when the determined row quantity is three. Thus, the interface module 101 may arrange four video areas respectively in the first row and the second row, and arrange the other two video areas in the last row based on a first reference area number being a smallest integer greater than the average number. The analysis module 102 can also determine that the number of the video areas in each row is not equal to each other.

At block 34, the adjusting module 104 adjusts the first area size to generate a second area size and a third area size for the video areas according to the interface size when the number of the video areas in a specific one of the rows is different from that in each of the other rows. The second area size is determined for the video areas in the specific row, and the third area size is determined for the video areas in the other rows. The number of the video areas in the specific row is less than the number of the video areas in each of the other rows.

In at least one embodiment, the adjusting module 104 can enlarge the first area size to generate a fourth area size and a fifth area size. The fourth area size includes a fourth area width and a fourth area height, and the fifth area size includes a fifth area width and a fifth area height. In one embodiment, the adjusting module 104 can set the number of the video areas in the specific row as a first determined area number and set the number of the video areas in each of the other rows as a second determined area number. The fourth area width can be determined by dividing the interface width by the first determined area number, and the fifth area width can be determined by dividing the interface width by the second determined area number. Thus, a first enlarged ratio between the fourth area size and the first area size is different a second enlarged ratio between the fifth area size and the first area size since the fourth area width is different from the fifth area width. In addition, the fourth area height can be determined based on the fourth area width and the aspect ratio, and the fifth area height can be determined based on the fifth area width and the aspect ratio. In one embodiment, both of the ratios between the fourth area width and the fourth area height and between the fifth area width and the fifth area height are equal to the aspect ratio.

In at least one embodiment, the video areas may be too large to be simultaneously shown on the user interface 131 when the video areas are arranged based on the fourth area size and the fifth area size. In order to show all of the video signals on the user interface 131, the adjusting module 104 can shrink the fourth area size and the fifth area size to generate the second area size and the third area size. In the embodiment, a first shrink ratio between the second area size and the fourth area size is equal to a second shrink ratio between the third area size and the fifth area size. In the embodiment, a first adjusted ratio between the second area width and the first area width can be determined based on the first enlarged ratio and the first shrink ratio, and a second adjusted ratio between the third area width and the first area width can be determined based on the second enlarged ratio and the first second ratio. Since the first enlarged ratio is different from the second enlarged ratio, the first adjusted ratio is different from the second adjusted ratio. A detailed embodiment for block 34 can refer to FIG. 5A and FIG. 5B.

In at least one embodiment, the adjusting module 104 can also adjust the positions of the video areas before the adjusting module 104 adjusts the first area size.

In the embodiment, the adjusting module 104 can adjust the positions of the video areas until that the number of the video areas in the last row is equal to the first reference area number. For example, the number of the video areas is ten, the determined row quantity is three, and the first reference area number is four greater than the average number of the video areas per row. Thus, the layout module 103 can arrange four video areas in each of the first row and the second row, and arrange two video areas in the last row. However, the number of the video areas in the last row is two less than the first reference area number. The adjusting module 104 can adjust the positions of the video areas, so one of the video areas in each of the first row and the second row can be moved to the last row. Thus, the number of the video areas in the last row is adjusted from two to four, and the number of the video areas in each of the first two rows is adjusted from four to three. In one embodiment, the adjusting module 104 can set the number of the video areas in the adjusted first row as the first determined area number, and set the number of the video areas in the adjusted last row as the second determined area number after the adjusting module 104 adjusts the positions of the video areas.

At block 35, the layout module 103 adjusts the user interface 131 to show the video signals in the video areas. In one embodiment, the layout module 103 arranges the video areas based on the first area size when the number of the video areas in each of the rows is equal to each other. In the embodiment, the sizes of the video areas are arranged to be identical to the first area size. In one embodiment, the layout module 103 arranges the video areas based on the second area size and the third area size when the number of the video areas in each of the rows is not equal to each other. In the embodiment, the sizes of the video areas are arranged to be identical to the second area size or the third area size.

In at least one embodiment, the layout module 103 can set a video region surrounding the video areas. In one embodiment, the layout module 103 can arrange the video region to be horizontally centered in the user interface 131 or aligned along the right side or the left side of the user interface 131. In one embodiment, the layout module 103 can arrange the video region to be vertically centered in the user interface 131 or aligned along the top or the bottom of the user interface 131.

Figure 6B:
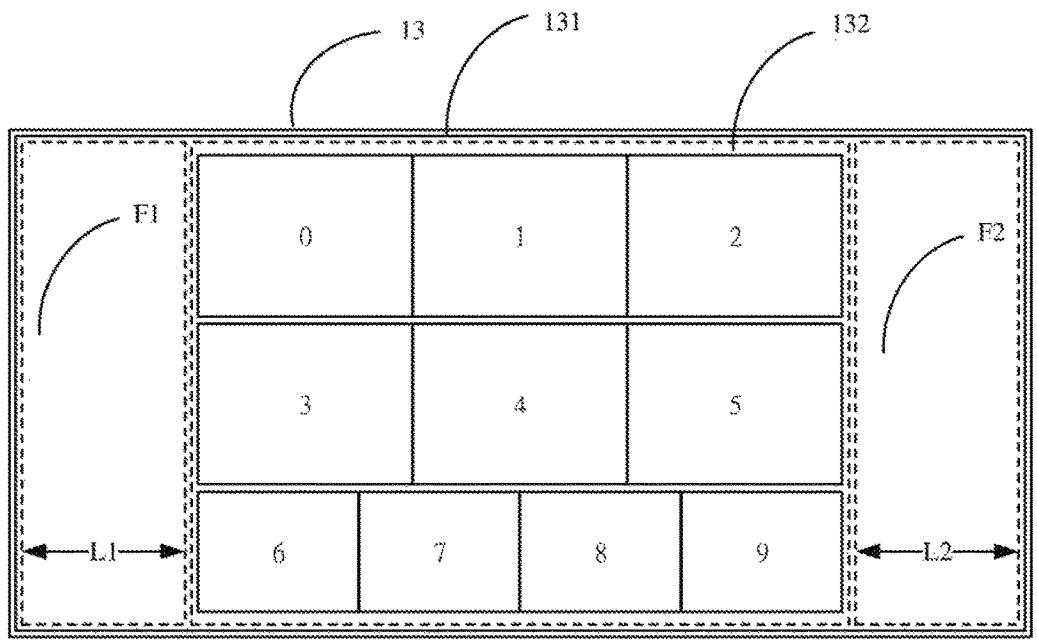
FIG. 6B is a block diagram of a ninth exemplary embodiment of another user interface shown on the display device of the electronic device.

FIG. 6B is a block diagram of a ninth exemplary embodiment of another user interface 131 shown on the display device 13 of the electronic device 1. In the embodiment, the layout module 103 can set the video region 132 surrounding the video areas having the indexes 0-9.

In at least one embodiment, the layout module 103 can compare a region size of the video region 132 with the interface size. In at least one embodiment, the layout module 103 can determine a first remaining area at the left side of the user interface 131 and a second remaining area at the right side of the user interface 131 based on the size difference between the user interface 131 and the video region 132. If one of remaining widths L1 and L2 of the first and second remaining areas is longer than a predefined width, the layout module 103 can generate an idle region for the first remaining area or the second remaining area. In one embodiment, the first remaining width L1 of the first remaining area is a distance between the left sides of the user interface 131 and the video region 132, and the second remaining width L2 of the second remaining area is a distance between the right sides of the user interface 131 and the video region 132. In one embodiment, the predefined width can be set as 5 cm. For example, the layout module 103 can generate a first idle region F1 at the left side of the user interface 131 when the first remaining width L1 is longer than the predefined width. The layout module 103 also can generate a second idle region F2 at the right side of the user interface 131 when the second remaining width L2 is longer than the predefined width. In one embodiment, the layout module 103 can set the remaining width as the width of the idle region, and set the interface height as the height of the idle region.

In at least one embodiment, the layout module 103 can determine a third remaining area at the top of the user interface 131 and a fourth remaining area at the bottom of the user interface 131 based on the size difference between the user interface 131 and the video region 132. If one of the remaining heights of the third and fourth remaining areas is longer than a predefined height, the layout module 103 can generate an idle region for the third remaining area or the fourth remaining area at the top or the bottom of the user interface 131. In one embodiment, the first remaining height of the third remaining area is a distance between the tops of the user interface 131 and the video region 132, and the second remaining height of the fourth remaining area is a distance between the bottoms of the user interface 131 and the video region 132. In one embodiment, the predefined height can be set as 5 cm. In one embodiment, the layout module 103 can set the remaining height as the height of the idle region, and set the interface width as the width of the idle region.

In at least one embodiment, the adjusting module 104 can adjust the second area size and the third area size again based on user's request when the user selects at least one of the video areas and set the size for the selected video areas. The adjusting module 104 can directly set the size for the selected video areas and check the number of the unselected video areas. Then, the video display system 10 can adjust the second area size and the third area size for unselected video areas via blocks 32-35.

Figure 4A:
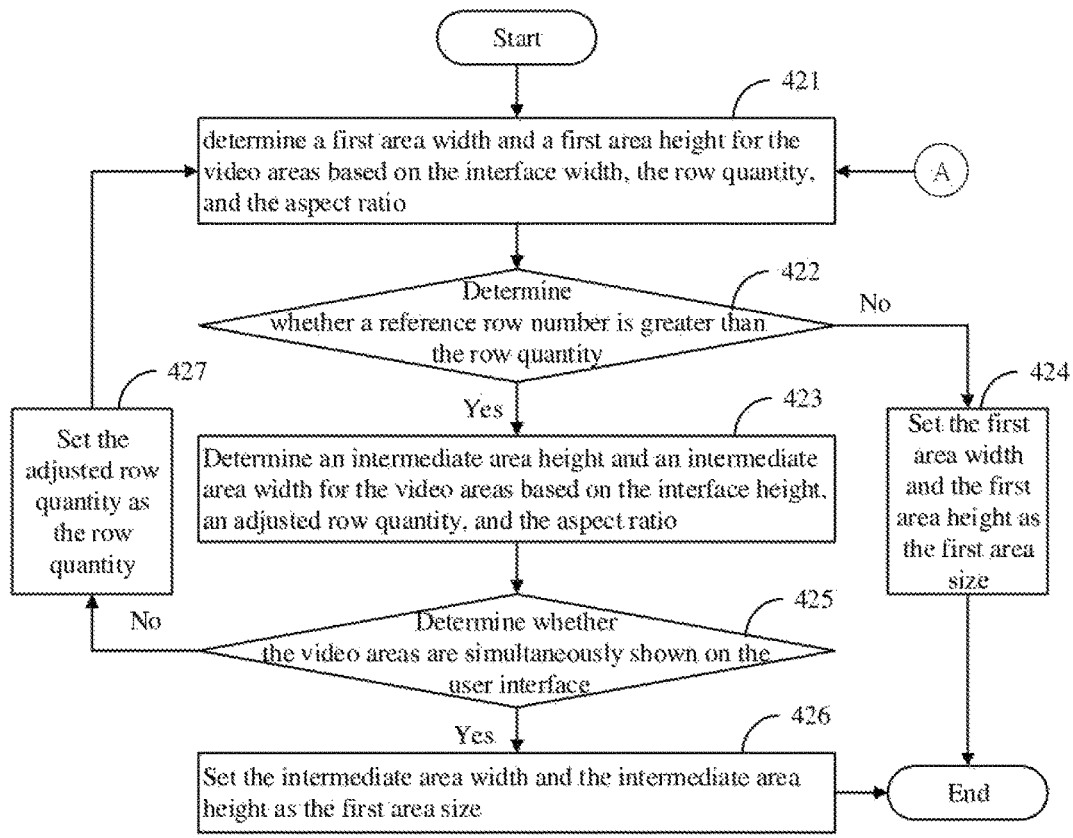
FIG. 4A illustrates a flowchart of a fourth exemplary embodiment of a video display method for the electronic device of FIG. 1.

FIG. 4A illustrates a flowchart of a fourth exemplary embodiment of a video display method for the electronic device of FIG. 1. The example method is provided by way of example, as there are a variety of ways to carry out the method. The method described below can be carried out using the configuration illustrated in FIG. 1, for example, and various elements of these figures are referenced in explaining the example method. Each block shown in FIG. 4A represents one or more processes, methods, or subroutines, carried out in the example method. Furthermore, the order of blocks is illustrative only and can change. Additional blocks can be added or less blocks can be utilized without departing from this disclosure. In one embodiment, FIG. 4A can be a detailed embodiment of block 32 in FIG. 3.

At block 421, the analysis module 102 determines a first area width and a first area height for the video areas based on the interface width, the row quantity, and the aspect ratio.

In at least one embodiment, the analysis module 102 determines average number of the video areas per row, and then determines the first area width based on the interface width and the average number. For example, the number of the video signals is ten and the row quantity is two. Then, the interface module 101 can generate ten video areas, and the analysis module 102 determines the average number as five. Thus, the analysis module 102 can determine the first area width by dividing the interface width by five. In another embodiment, the number of the video signals is ten and the row quantity is three. Then, the interface module 101 can generate ten video areas, and the analysis module 102 determines the average number as 3.33. In the embodiment, the analysis module 102 can further generate the first reference area number being equal to four since the average number is not an integer. The first reference area number is a smallest integer that is greater than the average number. Then, the analysis module 102 can determine the first area width by dividing the interface width by the first reference area number equal to four.

In at least one embodiment, the analysis module 102 determines the first area height for the video areas based on the first area width and the aspect ratio. For example, the interface width is 100 cm, the interface height is 50 cm, and the row quantity is one. The analysis module 102 can set the first area width as 10 cm based on the first reference area number equal to ten, and set the first area height as 5.6 cm based on the aspect ratio being 16:9. Then, the layout module 103 can arrange the ten video areas in one row on the user interface 131 based on the first area width and the first area height.

At block 422, the analysis module 102 determines whether a reference row number is greater than the row quantity. If the reference row number is greater than the row quantity, the procedure goes to block 423. If the reference row number is equal to or less than the row quantity, the procedure goes to block 424.

In at least one embodiment, the analysis module 102 determines the reference row number based on the interface height and the first area height. The analysis module 102 can divide the interface height by the first area height to generate a height divided result. In the embodiment, the analysis module 102 can determine the reference row number being equal to a largest integer that is less than the height divided result. The reference row number is a maximum of the row quantity when the video areas having the first area height are arranged on the user interface 131.

In at least one embodiment, the analysis module 102 determines whether the reference row number is greater than the row quantity. If the reference row number is less than or equal to the row quantity, the layout module 103 can set the first area width and the first area height as the first area size at block 424. The layout module 103 can further arrange the video areas based on the first area size and the row quantity for showing the video signals on the user interface 131 of the display device 13. If the reference row number is greater than the row quantity, the row quantity is less than the maximum of the row quantity. Thus, the analysis module 102 determines that the row quantity can be increased, and adjusts the row quantity to determine the first area size based on the adjusted row quantity at block 423. For example, the interface height is 50 cm, the first area height is 5.6 cm, so the reference row number is equal to eight. Thus, when the row quantity is equal to one and less than the reference row number, the analysis module 102 can adjusts the row quantity. In addition, the number of the rows on the user interface 131 cannot be greater than eight if the video display system 10 receives enough video signals to fill the user interface 131.

At block 423, the analysis module 102 adjusts the row quantity, and determines an intermediate area height and an intermediate area width for the video areas based on the interface height, the aspect ratio, and the adjusted row quantity. In one embodiment, the analysis module 102 can add one to the row quantity to generate the adjusted row quantity.

In at least one embodiment, the analysis module 102 determines the intermediate area height by dividing the interface height by the adjusted row quantity and determines the intermediate area width by multiplying the intermediate area height by the aspect ratio. For example, the adjusted row quantity is two, and the interface height is 50 cm. The analysis module 102 can determine the intermediate area height as 25 cm based on the interface height and the adjusted row quantity, and determine the intermediate width as 44.4 cm based on the intermediate area height and the aspect ratio being equal to 16:9.

At block 424, the analysis module 102 sets the first area width and the first area height as the first area size when the reference row number is less than or equal to the row quantity.

In at least one embodiment, the analysis module 102 can determine that a currently selected row quantity is suitable for the video areas to be arranged on the user interface 131 when the reference row number is less than or equal to the row quantity. Then, the analysis module 102 can determine that the first area width and the first area height generated based on the currently selected row quantity and the aspect ratio are suitable sizes for the video areas. Thus, the analysis module 102 can set the first area width and the first area height as the first area size of the video areas.

At block 425, the analysis module 102 determines whether the video areas arranged based on the intermediate area height and the intermediate area width can be simultaneously shown on the user interface 131. If all of the video areas can be simultaneously shown on the user interface 131, the procedure goes to block 426. If at least one of the video areas cannot be simultaneously shown with the other video areas, the procedure goes to block 427. In one embodiment, the sizes of the video areas can be arranged to be identical to the intermediate area height and the intermediate area width.

In at least one embodiment, the analysis module 102 can divide the interface width by the intermediate area width to generate a width divided result, and determine a second reference area number based on the width divided result. When the width divided result is an integer, the second reference area number is equal to the width divided result. When the width divided result is not an integer, the second reference area number is set as a largest integer which is less than the width divided result. Then, the analysis module 102 can further determine a third reference area number by multiplying the second reference area number by the adjusted row quantity. In the embodiment, the third reference area number is the number of the video areas which can be simultaneously shown on the user interface 131 when the video areas is arranged based on the intermediate area width and the intermediate area height.

In at least one embodiment, the analysis module 102 can determine that all of the video areas can be simultaneously shown on the user interface 131 when the third reference area number is greater than or equal to the number of the video areas. In at least one embodiment, the analysis module 102 can determine that at least one of the video areas can not be simultaneously shown on the user interface 131 with the other video areas when the third reference area number is less than the number of the video areas. For example, the intermediate width as 44.4 cm, the interface width is 100 cm, and the adjusted row quantity is two. Thus, the analysis module 102 can determine the second reference area number is two, and determine the third reference area number is four. When the number of the video signals is ten greater than the third reference area number, the analysis module 102 can determine that only four video signals can be simultaneously shown in four video areas having the intermediate width and the intermediate height. In other words, six video signals can be not be shown on the user interface 131. Thus, the analysis module 102 can determine the first area width and the first area height again based on the adjusted row quantity. When the number of the video signals is four equal to the third reference number, the analysis module 102 can determine that all of the video signals can be simultaneously shown in the four video areas having the intermediate width and the intermediate height. Thus, the analysis module 102 can directly set the intermediate width and the intermediate height as the first area size.

At block 426, the analysis module 102 sets the intermediate area width and the intermediate area height as the first area size when the reference row number is less than or equal to the row quantity.

In at least one embodiment, the analysis module 102 can determine that the currently adjusted row quantity is suitable for the video areas to be arranged on the user interface 131 when all of the video areas can be simultaneously displayed on the user interface 131. Then, the analysis module 102 can determine that the intermediate area width and the intermediate area height generated based on the currently adjusted row quantity and the aspect ratio are suitable sizes for the video areas. Thus, the analysis module 102 can set the intermediate area width and the intermediate area height as the first area size of the video areas.

At block 427, the analysis module 102 sets the adjusted row quantity as the row quantity when at least one of the video areas cannot be simultaneously shown on the user interface 131 with the other video areas, and then the procedure goes to block 421. In the embodiment, the analysis module 102 can determine the first area width and the first area height for the video areas again based on the interface width, the adjusted row quantity, and the aspect ratio at block 421.

For example, the interface width is 100 cm, the interface height is 30 cm, and the aspect ratio is 16:9. When the electronic device 1 receives five video signals, the interface module 101 can generate five video areas and set the row quantity as one first. The analysis module 102 can generate average number of the video areas per row as five, and generate the first reference area number being equal to five. Then, the analysis module 102 can set the first area width as 20 cm and set the first area height as 11.3 cm based on the interface width and the first reference number at block 421. Then, the analysis module 102 determines that the reference row number is equal to two and greater than the row quantity at block 422. Thus, the analysis module 102 adjusts the row quantity to two, and sets the intermediate area height as 15 cm based on the intermediate height and the adjusted row quantity. The intermediate area width can be set as 26.7 cm based on the intermediate area height and the aspect ratio at block 423. Then, the analysis module 102 generates the second reference area number as three based on the interface width and the intermediate area width, and generates the third reference area number equal to six by multiplying the second reference area by the adjusted row quantity. Since the third reference area number is greater than the number of the video areas, the analysis module 102 sets the intermediate area width and the intermediate area height as the first area size being 26.7 cm×15 cm, and set the row quantity as two.

When the electronic device 1 receives seven video signals, the interface module 101 can generate seven video areas and set the row quantity as one first. The analysis module 102 can generate the first reference area number being equal to seven. Then, the analysis module 102 can set the first area width as 14.3 cm and set the first area height as 8 cm at block 421. Then, the analysis module 102 determines that the reference row number is equal to three and greater than the row quantity at block 422. Thus, the analysis module 102 adjusts the row quantity to two, and sets the intermediate area height and intermediate area width respectively as 15 cm and 26.7 cm at block 423. Then, the analysis module 102 generates the third reference area number equal to six. Since the third reference area number is less than the number of the video areas at block 425, the analysis module 102 set the adjusted row quantity as the row quantity being equal to two at block 427. The analysis module 102 can generate average number of the video areas per row as 3.5, and generate the first reference area number being equal to four. The analysis module 102 can set the first area width as 25 cm and set the first area height as 14.1 cm at block 421. Then, the analysis module 102 determines that the reference row number is equal to two and equal to the row quantity at block 422. Thus, the analysis module 102 sets the first area width and the first area height as the first area size being 25 cm×14.1 cm, and set the row quantity as two.

When the electronic device 1 receives eleven video signals, the interface module 101 can generate eleven video areas and set the row quantity as one first. The analysis module 102 can generate the first reference area number being equal to eleven. Then, the analysis module 102 can set the first area width as 9.1 cm and set the first area height as 5.1 cm at block 421. Then, the analysis module 102 determines that the reference row number is equal to five and greater than the row quantity at block 422. Thus, the analysis module 102 adjusts the row quantity to two, and sets the intermediate area height and intermediate area width respectively as 15 cm and 26.7 cm at block 423. Then, the analysis module 102 generates the third reference area number equal to six. Since the third reference area number is less than the number of the video areas at block 425, the analysis module 102 sets the adjusted row quantity as the row quantity being equal to two at block 427. The analysis module 102 can generate average number of the video areas per row as 5.5, and generate the first reference area number being equal to six. Then, the analysis module 102 can set the first area width as 16.7 cm and set the first area height as 9.4 cm at block 421. Then, the analysis module 102 determines that the reference row number is equal to three and greater than the row quantity at block 422. Thus, the analysis module 102 adjusts the row quantity to three, and sets the intermediate area height as 10 cm based on the intermediate height and the adjusted row quantity. The intermediate area width can be set as 17.8 cm based on the intermediate area height and the aspect ratio at block 423. Then, the analysis module 102 generates the second reference area number as five based on the interface width and the intermediate area width, and generates the third reference area number equal to fifteen by multiplying the second reference area by the adjusted row quantity. Since the third reference area number is greater than the number of the video areas, the analysis module 102 sets the intermediate area width and the intermediate area height as the first area size being 17.8 cm×10 cm, and set the row quantity as three.

Figure 4B:
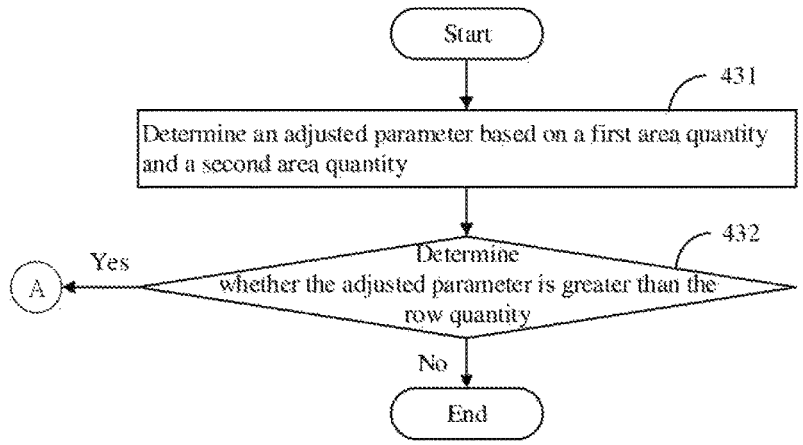
FIG. 4B illustrates a flowchart of a fifth exemplary embodiment of a video display method for the electronic device of FIG. 1.

FIG. 4B illustrates a flowchart of a fifth exemplary embodiment of a video display method for the electronic device of FIG. 1. The example method is provided by way of example, as there are a variety of ways to carry out the method. The method described below can be carried out using the configuration illustrated in FIG. 1, for example, and various elements of these figures are referenced in explaining the example method. Each block shown in FIG. 4B represents one or more processes, methods, or subroutines, carried out in the example method. Furthermore, the order of blocks is illustrative only and can change. Additional blocks can be added or less blocks can be utilized without departing from this disclosure. In one embodiment, FIG. 4B can be a detailed embodiment of block 33 in FIG. 3.

At block 431, the analysis module 102 determines an adjusted parameter based on a first area quantity and a second quantity after the analysis module 102 determines that the number of the video areas in each row is not equal to each other. In the embodiment, the first area quantity and the second area quantity are determined based on the number of the video areas per row when the video areas having the first area size are arranged on the user interface 131. In the embodiment, the first area quantity is greater than the second area quantity.

In at least one embodiment, the analysis module 102 can divide the rows into a first row group and a second row group based on the number of the video areas per row. In one embodiment, there are N1 video areas in each row of the first row group, and there and N2 video areas in each row of the second row group. In the embodiment, the analysis module 102 sets N1 as the first area quantity and sets N2 as the second area quantity. Then, the analysis module 102 can determine the adjusted parameter by subtracting the second area quantity from the first area quantity. For example, there are four video areas in the first and the second row, while there are two video areas in the last row. Thus, the first row and the second row can be set as the first row group, and the last row can be the second row group. In addition, N1 is equal to four, and N2 is equal to two.

At block 432, the analysis module 102 determines whether the adjusted parameter is greater than the row quantity. If the adjusted parameter is greater than the row quantity, the analysis module 102 can determine the first area width and the first area height again for the video areas based on the interface width, the row quantity, and the aspect ratio, and the procedure goes to block 421. If the adjusted parameter is less than the row quantity, the analysis module 102 determine the row quantity is a finally determined row quantity and the procedure ends.

In at least one embodiment, the analysis module 102 determines the first area quantity equal to the first reference area number determined in block 421 when the first area size is determined based on the first area width and the first area height at block 424. The first reference area number is a smallest number greater than the average number of the video areas per row. When the layout module 103 arranges the video areas in N rows based on the rules that the number of the video areas in each of the N−1 rows is equal to the first reference area number, the distribution of the video areas in N rows will be close to the average distribution. The adjusted parameter will be less than the row quantity. Thus, the analysis module 102 can ignore the procedure in the fifth exemplary embodiment of the video display method when the first area size is determined based on the first area width and the first area height at block 424.

In at least one embodiment, the analysis module 102 determines the first area quantity equal to the second reference area number determined in block 423 when the first area size is determined based on the intermediate area width and the intermediate area height at block 426. The second reference area number is determined based on the divided result between the interface width and the intermediate area width. Since the second reference area number is not determined based on the average number of the video areas, the second reference number may be much greater than, equal to, or much less than the average number. Thus, the distribution of the video areas may be very different from the average distribution, so the adjusted parameter may be much greater than the row quantity. The analysis module 102 can perform the procedure in the fifth exemplary embodiment of the video display method when the first area size is determined based on the intermediate area width and the intermediate area height at block 426.

In at least one embodiment, the analysis module 102 can determine the first area width and the first area height again for determining an appropriate area size and an appropriate first area quantity for the video areas when the adjusted parameter is greater the row quantity.

For example, the interface width is 100 cm, the interface height is 30 cm, and the aspect ratio is 16:9. When the electronic device 1 receives five video signals, the interface module 101 can generate five video areas. In addition, the analysis module 102 can set the first area size as 26.7 cm*15 cm, and set the row quantity as two at block 426. The analysis module 102 further determines the first area quantity equal to the second reference area number determined as three in block 425. Thus, the second area quantity is determined by subtracting the first area quantity from the number of the video areas. The analysis module 421 can determine the adjusted parameter as one by subtracting second area quantity from the first area quantity. Since the adjusted parameter is less than the row quantity, the analysis module 102 can determines that the layout module 103 can arrange three video areas in the first row and two video areas in the second row based on the first and the second area quantity.

When the electronic device 1 receives seven video signals, the interface module 101 can generate seven video areas. In addition, the analysis module 102 can set the first area size as 25 cm*14.1 cm, and set the row quantity as two at block 424. The analysis module 102 further determines the first area quantity equal to the first reference area number determined as three in block 421. Thus, the second area quantity is determined by subtracting the first area quantity from the number of the video areas. The analysis module 421 can determine the adjusted parameter as one by subtracting second area quantity from the first area quantity. Since the adjusted parameter is less than the row quantity, the analysis module 102 can determines that the layout module 103 can arrange four video areas in the first row and three video areas in the second row based on the first and the second area quantity.

When the electronic device 1 receives eleven video signals, the interface module 101 can generate eleven video areas. In addition, the analysis module 102 can set the first area size as 17.8 cm*10 cm, and set the row quantity as three at block 426. The analysis module 102 further determines the first area quantity equal to the second reference area number determined as five in block 425. Thus, the second area quantity is determined by subtracting the first area quantity twice from the number of the video areas. The analysis module 421 can determine the adjusted parameter as four by subtracting second area quantity from the first area quantity. Since the adjusted parameter is greater than the row quantity, the analysis module 102 can determine the first area width and the first area height again for determining an appropriate area size for the video areas based on the adjusted row quantity.

Figure 5A:
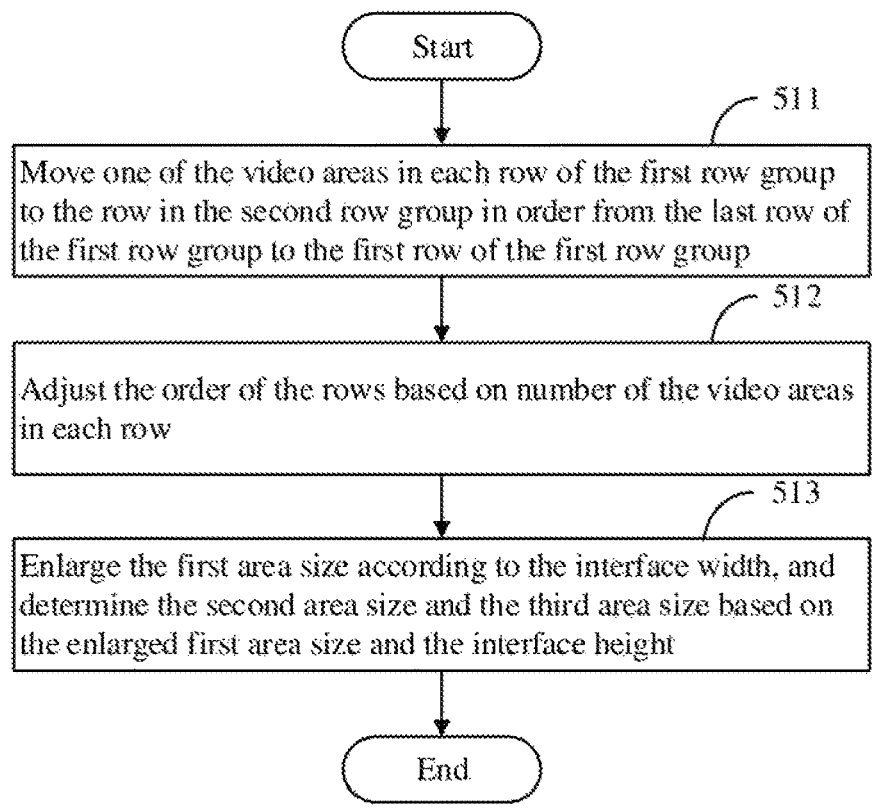
FIG. 5A illustrates a flowchart of a sixth exemplary embodiment of a video display method for the electronic device of FIG. 1.

FIG. 5A illustrates a flowchart of a sixth exemplary embodiment of a video display method for the electronic device of FIG. 1. The example method is provided by way of example, as there are a variety of ways to carry out the method. The method described below can be carried out using the configuration illustrated in FIG. 1, for example, and various elements of these figures are referenced in explaining the example method. Each block shown in FIG. 5A represents one or more processes, methods, or subroutines, carried out in the example method. Furthermore, the order of blocks is illustrative only and can change. Additional blocks can be added or less blocks can be utilized without departing from this disclosure. In one embodiment, FIG. 5A can be a detailed embodiment of block 34 in FIG. 3.

At block 511, the adjusting module 104 moves one of the video areas in each row of the first row group to the row in the second row group in order from the last row of the first row group to the first row of the first row group.

In at least one embodiment, the adjusting module 104 can move the video areas in each row of the first row group until that difference between the number of the video areas in the first row of the first row group and the number of the video areas in the row of the second row group is not greater than one. For example, the number of the video areas in each of the first two rows is four, and the number of the video areas in the last row is two. In the embodiment, the adjusting module 104 can move one of the four video areas in the second row to the last row. Thus, the number of the video areas in the last row is increased to three. Since difference between the number of the video areas in the first row and the number of the video areas in the last row is equal to one, the adjusting module 104 stops to move the video areas in the first row group.

At block 512, the adjusting module 104 adjusts the order of the rows. In the embodiment, the adjusting module 104 can adjust the order of the rows based on the number of the video areas in each row. If the number of the video areas in a specific one row is greater than the number of the video areas in the other rows, the specific row can be moved to the last one row.

In at last one embodiment, the adjusting module 104 can divide the rows into a third row group and a fourth row group based on the number of the video areas per row. The adjusting module 104 can further set the number of the video areas in each row of the third row group as a fourth reference area number, and set the number of the video areas in each row of the fourth row group as a fifth reference area number less than the fourth reference area number. Then, the adjusting module 104 can move the video areas in the rows of the third row group to be shown above the video areas in the rows of the fourth row group. For example, the original first two rows can be moved to be the last two row when the number of the video areas in each of the original first two rows is greater than the number of the video areas in the original last row.

At block 513, the adjusting module 104 enlarges the first area size based on the interface width, and generates the second area size and the third area size based on the enlarged first area size and the interface height.

In at least one embodiment, the adjusting module 104 can enlarge the first area size to generate a fourth area size and a fifth area size. The fourth area size includes a fourth area width and a fourth area height, and the fifth area size includes a fifth area width and a fifth area height. The fourth area width can be determined by dividing the interface width by the fourth reference area number, and the fifth area width can be determined by dividing the interface width by the fifth reference area number. Thus, a first enlarged ratio between the fourth area size and the first area size is different a second enlarged ratio between the fifth area size and the first area size, since the fourth reference area number is greater than the fifth reference area number. In addition, the fourth area height can be determined based on the fourth area width and the aspect ratio, and the fifth area height can be determined based on the fifth area width and the aspect ratio.

In at least one embodiment, the enlarged video areas may be too large to be simultaneously shown on the user interface 131 when the video areas are arranged based on the fourth area size and the fifth area size. In order to show all of the video areas simultaneously on the user interface 131, the adjusting module 104 can shrink the fourth area size and the fifth area size to generate the second area size and the third area size. In the embodiment, a shrink ratio between the second area size and the fourth area size is equal to a shrink ratio between the third area size and the fifth area size. In the embodiment, the adjusting module 104 can estimate an entire height based on the fourth area height and the fifth area height. Then, the shrink ratio is determined by dividing the interface height by the estimated entire height. The adjusting module 104 can shrink the fourth area size and the fifth area size based on the shrink ratio to generate the second area size and the third area size.

In one embodiment, the first area size include a width equal to 25 cm and a height equal to 14.1 cm, four reference area number for the first row is four, and the fifth reference area number for the other two rows is three. When the interface width is 100 cm, the fourth area width is 25 cm and the fifth area width is 33.3 cm. Thus, the first enlarged ratio is equal to 1 and the second enlarged ratio is equal to 1.33. Then, the adjusting module 104 can determine than the fourth area height is still 14.1 cm and the fifth area height is still 18.8 cm. The adjusting module 104 estimates that the estimated entire height is equal to 46.9 cm. When the interface height is 30 cm, the shrink ratio can be set as 0.64. Thus, the adjusting module 104 can determine that the second area width, the second area height, the third area width, and the third area height can respectively be 16.0 cm, 9.0 cm, 21.3 cm, and 12.0 cm.

In at least one embodiment, the analysis module 102 may arrange five video areas in the first two rows and two video areas in the last row at block 416 when the analysis module 102 arranges twelve video areas in three rows. Then, adjusting module 104 may adjust the positions of the video areas until that the number of the video area in each of the three rows is equal to four. Thus, the first enlarged ratio can be equal to the second enlarged ratio when the number of the video areas in each row are equal to each other. In the embodiment, the fourth area size can be identical to the fifth area size, and the second area size can be identical to the third area size.

Figure 5B:
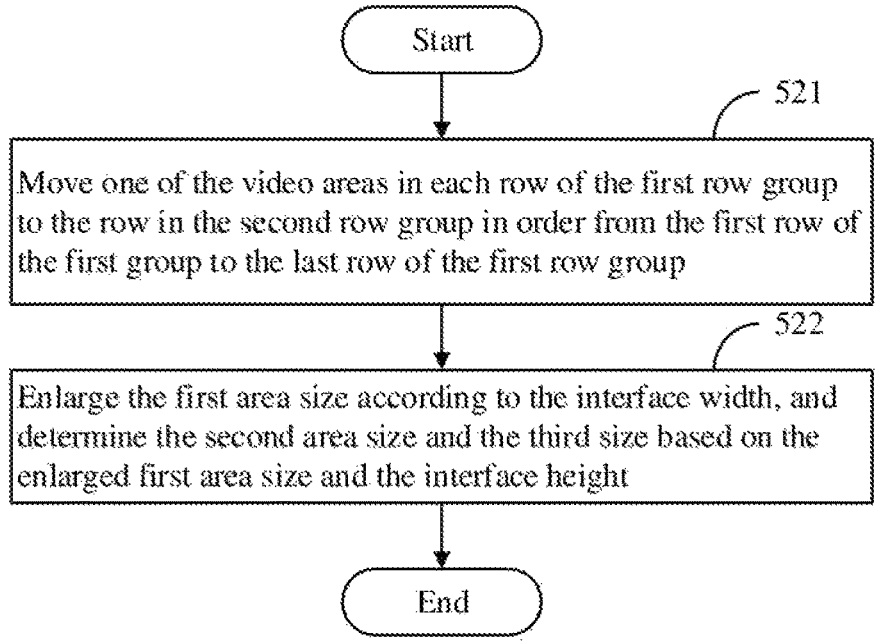
FIG. 5B illustrates a flowchart of a seventh exemplary embodiment of a video display method for the electronic device of FIG. 1.

FIG. 5B illustrates a flowchart of a seventh exemplary embodiment of a video display method for the electronic device of FIG. 1. The example method is provided by way of example, as there are a variety of ways to carry out the method. The method described below can be carried out using the configuration illustrated in FIG. 1, for example, and various elements of these figures are referenced in explaining the example method. Each block shown in FIG. 6B represents one or more processes, methods, or subroutines, carried out in the example method. Furthermore, the order of blocks is illustrative only and can change. Additional blocks can be added or less blocks can be utilized without departing from this disclosure. In one embodiment, FIG. 5A can be a detailed embodiment of block 34 in FIG. 3.

At block 521, the adjusting module 104 moves one of the video areas in each row of the first row group to the row in the second row group in order from the first row of the first row group to the last row of the first row group.

In at least one embodiment, the adjusting module 104 can move the video areas in each row of the first row group until that the number of the video areas in the row of the second row group is greater than or equal to the number of the video areas in the last row of the first row group. For example, the number of the video areas in each of the first two rows is four, and the number of the video areas in the last row is two. In the embodiment, the adjusting module 104 can move one of the four video areas in the first row to the last row. Thus, the number of the video areas in the last row is increased to three, and the number of the video areas in the second row is still four. Since the number of the video areas in the last row is still less than the number of the video areas in the second row, the adjusting module 104 can move one of the four video areas in the second row to the last row. Then, the number of the video areas in the last row is increased to four, and the number of the video areas in the second row is decreased to three. Since the number of the video areas in the last row is greater than the number of the video areas in the second row, the adjusting module 104 stops to move the video areas in the first row group.

At block 522, the adjusting module 104 enlarges the first area size based on the interface width, and generate the second area size and the third area size based on the enlarged first area size and the interface height.

In at least one embodiment, the adjusting module 104 can enlarge the first area size to generate a fourth area size and a fifth area size. The fourth area size includes a fourth area width and a fourth area height, and the fifth area size includes a fifth area width and a fifth area height. The fourth area width can be determined by dividing the interface width by the fourth reference area number, and the fifth area width can be determined by dividing the interface width by the fifth reference area number. Thus, a first enlarged ratio between the fourth area size and the first area size is different a second enlarged ratio between the fifth area size and the first area size, since the fourth reference area number is greater than the fifth reference area number. In addition, the fourth area height can be determined based on the fourth area width and the aspect ratio, and the fifth area height can be determined based on the fifth area width and the aspect ratio.

In at least one embodiment, the enlarged video areas may be too large to be simultaneously shown on the user interface 131 when the video areas are arranged based on the fourth area size and the fifth area size. In order to show all of the video areas simultaneously on the user interface 131, the adjusting module 104 can shrink the fourth area size and the fifth area size to generate the second area size and the third area size. In the embodiment, a shrink ratio between the second area size and the fourth area size is equal to a shrink ratio between the third area size and the fifth area size. In the embodiment, the adjusting module 104 can estimate an entire height based on the fourth area height and the fifth area height. Then, the shrink ratio is determined by dividing the interface height by the estimated entire height. The adjusting module 104 can shrink the fourth area size and the fifth area size based on the shrink ratio to generate the second area size and the third area size.

In at least one embodiment, the video areas in each of the rows can be horizontally centered. In addition, if the row quantity is equal to one, the video areas can be aligned along the bottom of the user interface 131, aligned along the bottom of the user interface 131, or vertically centered in the user interface 131. If the row quantity is greater than one, the layout module 103 can arrange the video areas from left to right and from up to down to generate the video region. Then, the video region can be aligned along the bottom of the user interface 131, aligned along the bottom of the user interface 131, or vertically centered in the user interface 131.

In at least one embodiment, the interface module 101 rechecks the interface size when the interface size is changed by users. Then, the analysis module 102 can determine the second area size and the third area size based on the adjusted interface size at blocks 31 to 35.

In at least one embodiment, the interface module 101 generates a new video area for a new video signal and increases the number of the secondary video areas, if a new video device provides the new video signal for showing in the display device 13. Then, the analysis module 102 can determine a new area size based on the increased number at blocks 32 to 35.

In at least one embodiment, the interface module 101 erases one of the video areas and decreases the number of the video areas, if the electronic device 1 does not receive one of the video signals. Then, the analysis module 102 can determine a new area size based on the decreased number at blocks 32 to 35. In addition, the analysis module 102 also determines a new area size based on the decreased number at blocks 32 to 35 when the electronic device 1 receives an input to stop showing one of the received video signals on the display device 13.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. An electronic device, comprising:
    a processing device; and
    a storage device coupled to the processing device and storing a plurality of instructions which, when executed by the processing device, cause the processing device to:
    generate a user interface including a plurality of video areas for showing a plurality of video signals on a display device coupled to the electronic device, wherein the user interface has an interface size, and the plurality of video areas are arranged in at least one row;
    determine a first area size for the video areas based on the interface size, a row quantity and an aspect ratio, and arrange the plurality of video areas based on the first area size and the row quantity, wherein the row quantity is equal to the number of the at least one row;
    determine whether the number of the video areas in each row is equal to each other;
    adjust the first area size to generate a second area size for the video areas in at least one specific row and a third area size for the video areas in the other rows according to the interface size, when the number of the video areas in each of the at least one specific row is different from the number of the video areas in each of the other rows; and
    show the video signals in the video areas based on the second area size and the third area size on the display device.

2. The electronic device according to claim 1, wherein the interface size include an interface width and an interface height.

3. The electronic device according to claim 2, further comprising instructions to:
    determine a first area width for the video areas based on the interface width, the row quantity, and the aspect ratio;
    determine whether a reference row number is greater than the row quantity, wherein the reference row number is generated based on a first ratio between the interface height and the first area height; and
    determine the first area width and the first area height as the first area size when the reference row number is less than or equal to the row quantity.

4. The electronic device according to claim 3, further comprising instructions to:
    adjust the row quantity, and determine an intermediate area height and an intermediate area width for the video areas based on the interface height, the adjusted row quantity, and the aspect ratio when the reference row number is greater that the row quantity;
    determine whether the video areas are simultaneously shown on the user interface when the video areas is arranged on the user interface based on the intermediate area height and the intermediate area width;
    adjust the first area width and the first area height based on the adjusted row quantity when the video areas are not simultaneously shown on the user interface; and
    determine the intermediate area height and the intermediate area width as the first area size when the video areas are simultaneously shown on the user interface.

5. The electronic device according to claim 4, further comprising instructions to:
    determine an adjusted parameter based on a first area quantity and a second area quantity, wherein the first area quantity is the number of the video areas in each of the at least one specific row, and the second quantity is the number of the video areas in each of the other rows;
    determine whether the adjusted parameter is greater than the adjusted row quantity; and
    adjusted the first area width and the first area height based on the adjusted row quantity when the adjusted parameter is greater than the adjusted row quantity.

6. The electronic device according to claim 2, further comprising instructions to:
    enlarge the first area size to generate a fourth area size for the video areas in the at least one specific row and a fifth area size for the video areas in the other rows according to the interface width, when the number of the video areas in each of the at least one specific row is different from the number of the video areas in each of the other rows;
    estimate an entire height by a fourth area height of the fourth area size and a fifth area height of the fifth area size;
    determine whether the estimated entire height is longer than the interface height;
    shrink the fourth area size and the fifth area size to generate the second area size and the third area size when the estimated entire height is longer than the interface height; and
    set the fourth area size as the second area size and set the fifth area size as the third area size when the estimated entire height is shorter than or identical to the interface height.

7. The electronic device according to claim 6, wherein a first shrink ratio between the second area size and the fourth area size is equal to a second shrink ratio between the third area size and the fifth area size.

8. The electronic device according to claim 6, wherein a fourth area width of the fourth area size is determined by dividing the interface width by the number of the video areas in each of the at least one specific row, the fourth area height is determined based on the fourth area width and the aspect ratio, a fifth area width of the fifth area size is determined by dividing the interface width by the number of the video areas in each of the other rows, and the fifth area height is determine based on the fifth area width and the aspect ratio.

9. The electronic device according to claim 1, wherein the second area size includes a second area width and a second area height, the third area size includes a third area width and a third area height, and a first adjusted ratio between the second area width and the first area width is different from a second adjusted ratio between the third area width and the first area width.

10. The electronic device according to claim 1, further comprising instructions to:
   show the video signals in the video areas based on the first area size on the display device when the number of the video areas in each row is equal to each other.

11. The electronic device according to claim 1, further comprising:
   a communication device coupled to a plurality of video devices, each of the video devices has an image capturing unit and a communication unit to provide one of the video signals to the communication device.

12. A video display method for an electronic device to show a plurality of video signals on a display device coupled to the electronic device, the method comprising:
   generating a user interface including the plurality of video areas for showing a plurality of video signals on the display device, wherein the user interface has an interface size, and the plurality of video areas are arranged in at least one row;
   determining a first area size for the video areas based on the interface size, a row quantity and an aspect ratio, and arrange the plurality of video areas based on the first area size and the row quantity, wherein the row quantity is the number of the at least one row;
   determining whether the number of the video areas in each row is equal to each other;
   adjusting the first area size to generate a second area size for the video areas in at least one specific row and a third area size for the video areas in the other rows according to the interface size, when the number of the video areas in each of the at least one specific row is different from the number of the video areas in each of the other rows; and
   showing the video signals in the video areas based on the second area size and the third area size on the display device.

13. The method according to claim 12, wherein the interface size include an interface width and an interface height.

14. The method according to claim 13, further comprising:
   determining a first area width for the video areas based on the interface width, the row quantity, and the aspect ratio;
   determining whether a reference row number is greater than the row quantity, wherein the reference row number is generated based on a first ratio between the interface height and the first area height; and
   determining the first area width and the first area height as the first area size when the reference row number is less than or equal to the row quantity.

15. The method according to claim 14, further comprising:
   adjusting the row quantity, and determine an intermediate area height and an intermediate area width for the video areas based on the interface height, the adjusted row quantity, and the aspect ratio when the reference row number is greater that the row quantity;
   determining whether the video areas are simultaneously shown on the user interface when the video areas is arranged on the user interface based on the intermediate area height and the intermediate area width;
   adjusting the first area width and the first area height based on the adjusted row quantity when the video areas are not simultaneously shown on the user interface; and
   determining the intermediate area height and the intermediate area width as the first area size when the video areas are simultaneously shown on the user interface.

16. The method according to claim 15, further comprising:
   determining an adjusted parameter based on a first area quantity and a second area quantity, wherein the first area quantity is the number of the video areas in each of the at least one specific row, and the second quantity is the number of the video areas in each of the other rows;
   determining whether the adjusted parameter is greater than the adjusted row quantity; and
   adjusting the first area width and the first area height based on the adjusted row quantity when the adjusted parameter is greater than the adjusted row quantity.

17. The method according to claim 13, further comprising:
   enlarging the first area size to generate a fourth area size for the video areas in the at least one specific row and a fifth area size for the video areas in the other rows according to the interface width, when the number of the video areas in each of the at least one specific row is different from the number of the video areas in each of the other rows;
   estimating an entire height by a fourth area height of the fourth area size and a fifth area height of the fifth area size;
   determining whether the estimated entire height is longer than the interface height;
   shrinking the fourth area size and the fifth area size to generate the second area size and the third area size when the estimated entire height is longer than the interface height; and
   setting the fourth area size as the second area size and set the fifth area size as the third area size when the estimated entire height is shorter than or identical to the interface height.

18. The method according to claim 12, further comprising:
   showing the video signals in the video areas based on the first area size on the display device when the number of the video areas in each row is equal to each other.

19. The method according to claim 12, further comprising:
   receiving the video signals from a plurality of video device, each of the video devices has an image capturing unit and a communication unit to provide one of the video signals to a communication device of the electronic device.

* * * * *